(12) United States Patent
Chajec et al.

(10) Patent No.: US 6,577,959 B1
(45) Date of Patent: Jun. 10, 2003

(54) FLUID LEVEL MEASURING SYSTEM FOR MACHINES

(75) Inventors: Zdzislaw W. Chajec, Escondido, CA (US); Steven D. Nelson, Fallbrook, CA (US); Eric A. Nelson, Fallbrook, CA (US); Kevin C. O'Brien, San Marcos, CA (US)

(73) Assignee: Power Plus Corporation, San Marcos, CA (US)

( * ) Notice: Subject to any disclaimer, the term of this patent is extended or adjusted under 35 U.S.C. 154(b) by 0 days.

(21) Appl. No.: 09/527,643

(22) Filed: Mar. 17, 2000

(51) Int. Cl.[7] .......................... G06F 17/00; G01F 23/00
(52) U.S. Cl. ...................... 702/50; 73/49.2; 73/290 V; 73/304 C; 73/317; 340/605; 701/29; 701/101
(58) Field of Search .............................. 702/50, 51, 52, 702/53, 54, 55; 73/40, 49.2, 290 V, 292, 304 C; 701/29, 101; 340/605; 184/1.5; 123/73 AD, 196 R

(56) References Cited

U.S. PATENT DOCUMENTS

| | | | | |
|---|---|---|---|---|
| 4,583,170 A | * | 4/1986 | Carlin et al. .................. 702/55 |
| 4,590,575 A | * | 5/1986 | Emplit ........................ 702/52 |
| 4,782,698 A | * | 11/1988 | Wilson ...................... 73/304 C |
| 4,806,847 A | * | 2/1989 | Atherton et al. .......... 73/304 C |
| 4,869,346 A |  | 9/1989 | Nelson ........................ 184/1.5 |
| 5,000,044 A | * | 3/1991 | Duffy et al. .................. 73/317 |
| 5,091,854 A | * | 2/1992 | Yoshimura et al. ........ 701/101 |
| 5,282,386 A | * | 2/1994 | Niemczyk et al. ............ 73/292 |
| 5,303,585 A | * | 4/1994 | Lichte ...................... 73/290 V |
| 5,390,762 A |  | 2/1995 | Nelson ...................... 184/1.5 |
| 5,402,110 A | * | 3/1995 | Oliver et al. ................ 340/605 |
| 5,461,903 A | * | 10/1995 | Harms ........................... 73/40 |
| 5,633,809 A | * | 5/1997 | Wissenbach et al. ......... 702/45 |
| 5,703,569 A | * | 12/1997 | Oliver et al. ................ 340/605 |
| 5,744,701 A | * | 4/1998 | Peterson et al. ............. 73/49.2 |
| 5,881,688 A |  | 3/1999 | Graham et al. ........ 123/73 AD |
| 5,915,499 A | * | 6/1999 | Few ............................ 184/1.5 |
| 5,970,942 A |  | 10/1999 | Koeberlein et al. ..... 123/196 R |
| 6,138,065 A | * | 10/2000 | Kramer ........................ 701/29 |
| 2001/0035048 A1 | * | 11/2001 | Gualtieri ................... 73/290 V |

* cited by examiner

*Primary Examiner*—John Barlow
*Assistant Examiner*—John Le
(74) *Attorney, Agent, or Firm*—Young & Basile, P.C.

(57) ABSTRACT

A fluid level measuring system for machines which utilizes fluids and has rotating and/or reciprocating elements. The system receives data from sensors as to the measured fluid level and measured fluid temperature. Optionally, data is received from other sensors such as to the angle of inclination of the machine, gear setting (for a transmission), idle speed (for an engine or transmission), and dielectric constant of the fluid. The measured data is stored in a first data storage device. A second data storage device contains data as to the recommended fluid level and acceptable deviations thereof based upon a variety of possible sensor readings, which can be obtained from sources such as the manufacturer of the machine or by controlled dynamic measurements. A processor compares the stored sensor readings to the data stored in the second memory to arrive at the operational fluid level. The processor controls a display to identify the operational fluid level to the operator. Optionally, the processor may determine whether or not to initiate a change in the fluid level and/or activate an alarm. One application of the fluid measurement system is identified for a transmission.

70 Claims, 6 Drawing Sheets

Point One is within an acceptable operating range.
Point Two is outside an acceptable operating range.

FLUID LEVEL MEASURING SYSTEM FOR MACHINES

BACKGROUND OF THE INVENTION

1. Field of the Invention

This invention relates to a fluid level measuring system for machines.

2. Description of the Prior Art

It is quite common for machines that have rotating and/or reciprocating elements to use a variety of fluids. These fluids can serve to lubricate, transfer heat, or any number of other uses. The level of these fluids can be critical to the operation of a machine. For example, if the level is too low then friction and inadequate heat transfer can damage the machine. If the level is to high, then the heat transfer may not be accomplished fast enough thus exposing the machine to overheating.

A major difficulty exists in measuring the level of fluid. Machines can incorporate elements that retain fluid within components of the machine when the machine is operating, temperatures and pressures within the machine can vary and thus effect the fluid level, and the fluid may interact with the air such that bubbles may exist within the fluid. These and other variables make it hard to obtain a precise measurement of the fluid in a machine. For abetter understanding of these issues a transmission is used as a representative machine.

Finding the level of transmission fluid has always posed a significant problem. To better understand this problem, it is necessary to discuss some relationships between the transmission and the transmission fluid. To begin with, transmissions have a pan that collects, transmission fluid. Fluid circulates through the transmission and the pan while the transmission is operating at a rate that is dependent upon factors such as the transmission gear setting and speed. When a transmission is not operating, fluid is drawn into the pan by the force of gravity. However, not all the fluid will drain into the pan. The transmission components have recesses, grooves, and crevasses that retain fluid. As a result, any reading of a transmission fluid level as measured relative to the bottom of the pan while the transmission is not operating does not include the fluid housed in the components and is thus not accurate.

Likewise, when a transmission is operating the fluid is dispersed throughout the working parts of the transmission with less than all of the fluid being in the pan. Naturally, this leads to a reading, e.g. via an electronic dipstick, of a fluid level which does not account for the transmission's disbursed fluid while the transmission is operating. To compound this problem the volume of the transmission fluid depends upon the operating temperature of the transmission. When the temperature is high, the fluid expands and there is a larger volume of fluid. These situations create a problem in accurately reading the transmission fluid level and thus obtaining information as to the adequate level or fill of transmission fluid.

It is well recognized in the art that problems exist when the fluid for a transmission in a motor vehicle is not at, or near, an optimum level. Improper levels of fluid can cause damage to the transmission in several ways. If the fluid level is low, then the components come into contact and excessive mechanical wear results. If the fluid level is high, then the heat generated by the transmission is not adequately dissipated by the fluid and excess thermal stress results on the components.

Transmissions are expensive to replace and can require that a vehicle, such as a bus or a truck, be taken out of service for what may amount to an extended period of time. Such a service procedure can reduce the profitability of an organization, further compounding the problem.

This problem can be alleviated by knowing the operational transmission fluid level and correcting any improper level conditions before excess wear is experienced. One method of correcting this problem appears in U.S. Pat. No. 4,869,346 to Donald Nelson. In that patent, the level of the engine lubricating oil is determined by a signal frogman electronic dipstick. The fluid level is transmitted to a processor that determines if new oil should be added or removed from the system and controls such addition and/or removal.

While this method is useful in monitoring the time between repairs, it has several shortcomings. If the motor vehicle, such as a bus, is operating on an incline or experiencing frequent stop and go motion then the dipstick may not accurately reflect the fluid-level. Additionally, the processor is not compensating the readings to reflect changes in the apparent oil level caused by thermal expansion or an irregular oil pan shape. This can result in a situation where fluid is added or removed when it is unnecessary to do so. The adjustment of the fluid level by this method is therefore not optimal. Furthermore, the operator is not apprised of the fluid level as determined by the processor or the dipstick.

Another patent by Nelson (U.S. Pat. No. 5,390,762) attempts to calculate the operational transmission fluid level by averaging a number of fluid level readings throughout the transmission. This accounts for any orientation of the engine. However, the speed of the engine can effect the apparent oil level.

At high speeds, the fluid as measured may be lower than at low speeds and the readings may not accurately reflect the fluid level. An average reading may trigger a change in the fluid level that is not necessary. Another drawback is that the placement of numerous fluid level sensors is expensive. A number of access ports must be provided in the transmission to receive the sensors. These openings must be drilled or provided by a similar means and must be leak proof. This is time consuming, expensive, and may result in damage to the transmission if not performed properly. Also, the fluid level is not displayed to the operator.

Another attempt to address the fluid level problem appears in U.S. Pat. No. 5,970,942 to Koeberlein et al and U.S. Pat. No. 5,881,688 to Graham et al. These patents are directed to an apparatus to replace engine lubricating oil based upon the fuel flow of the vehicle. In effect, the engine lubricating oil is continuously replaced but increased during periods of increased fuel consumption. This is referred to as a response to the engine s operating severity value.

The Graham patents do not take into account the operational oil level when changing the oil. As with the Nelson patents, the Koeberlein and Graham patents do not take into account such variables as oil temperature, idle speed or irregular pan shapes to arrive at an operational engine oil level. Nor do the patents anticipate or address the ability to display the operational engine lubricating oil level.

SUMMARY OF THE INVENTION

The present invention addresses a fluid level measurement system for a machine for determining an operational fluid level. A fluid level sensor within the machine provides the system with a fluid level signal that reflects the measured fluid level. A temperature sensor within the machine provides the system with a temperature signal. A first data storage device retains the measured fluid level and measured fluid temperature data. A second data storage device contains data for a range of recommended fluid levels based upon a variety of fluid levels and fluid temperatures, which can be obtained from sources such as the manufacturer or through controlled dynamic measurements.

A processor compares the measured sensor values retained in the first memory storage device to data in the second memory storage device. Once the measured values are matched with corresponding values in the second data storage device, then the operational fluid level can be identified, calculated, or estimated.

The present invention may best be understood by reference to the following description taken in conjunction with the accompanying drawings.

DESCRIPTION OF THE PREFERRED EMBODIMENT

The present invention may best be understood by reference to the following description taken in conjunction with the accompanying drawings.

Figure 1:
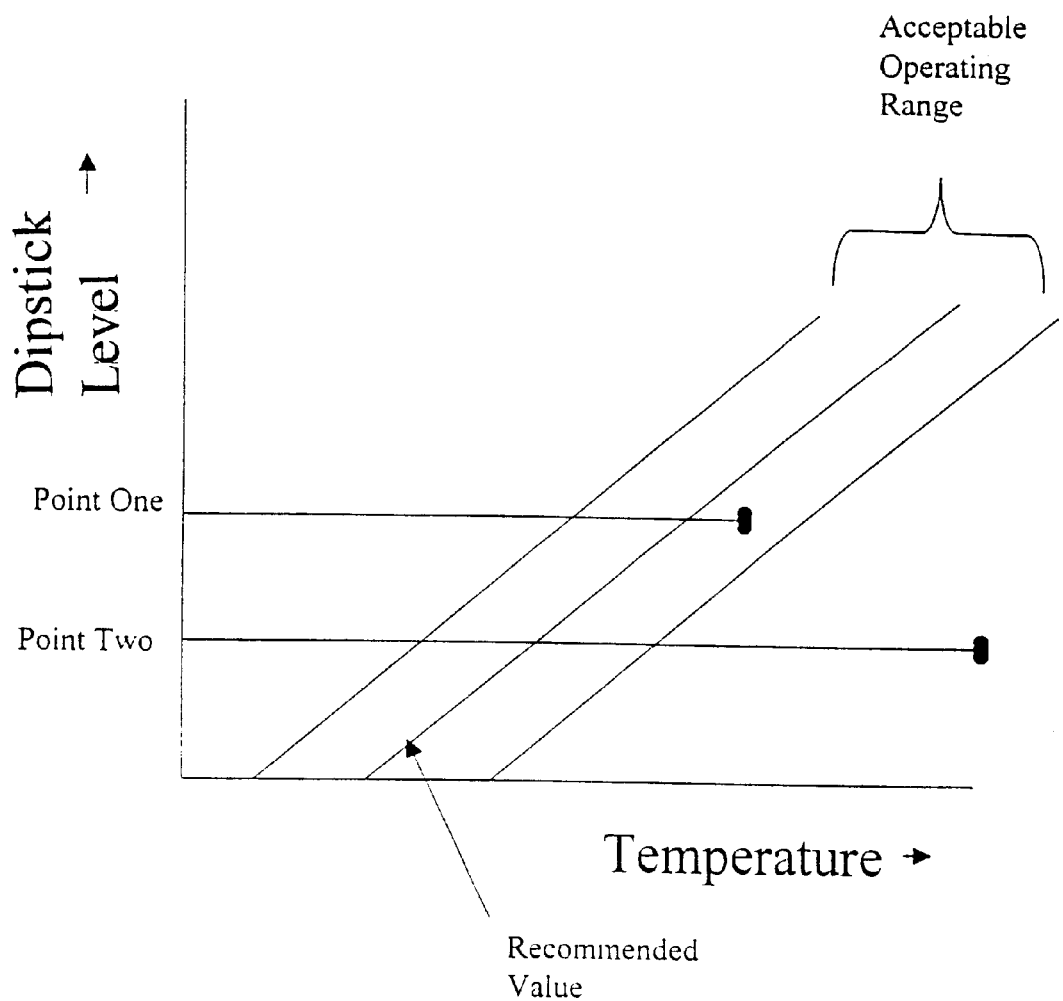
FIG. 1 is an illustrative graph of dipstick level verses temperature.
Figure 2:
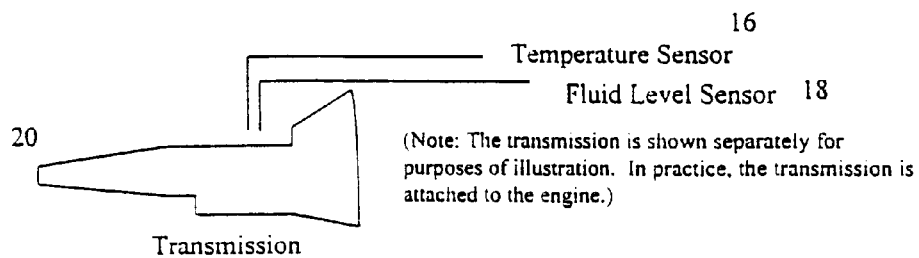
FIG. 2 is a diagram of a transmission, setup for obtaining controlled dynamic measurements based upon a temperature sensor and a fluid level sensor.

The system and method of the present invention is first described where only two variables, or sensors, are used to determine the operational fluid level of a transmission, i.e. the measured fluid level (via an electronic dipstick) and the fluid temperature. FIG. 1 illustrates how a representative sample of the level of transmission fluid during operation may vary with transmission fluid temperature. Point One in the figure indicates a condition where the level of fluid as a function of temperature is within an acceptable operating range. Point Two in the figure exemplifies a state where the transmission fluid level is outside an acceptable operating range.

Information is available to the system regarding the recommended level of transmission fluid. This can be accomplished in a number of ways. One method is to take direct measurements from a transmission operating under controlled conditions. In that method, a transmission is be filled to a level recommended by the manufacturer or operator.

A transmission is set to optimal operating conditions as per the manufacturer s specifications and set up for controlled dynamic measurements of an exact model number transmission in a controlled environment. This provides a known, or recommended transmission fluid level. The recommended transmission fluid level means the quantity of fluid within the transmission at a specified parameter such as temperature. Transmission manufacturers recommend a given fluid level (as an example a particular transmission model may require ten quarts of fluid at room temperature) operating at a specified fluid operating temperature (as an example a particular transmission model may operate at one hundred and ninety degrees Fahrenheit). This level of fill would be the recommended fluid level and would be measured in units such as pints or quarts.

As illustrated in FIG. 1., a fluid level sensor 18 and temperature sensor 16 is installed on a transmission 20 to obtain controlled dynamic measurements. The sensors provide data during the operation of the transmission.

Figure 3:
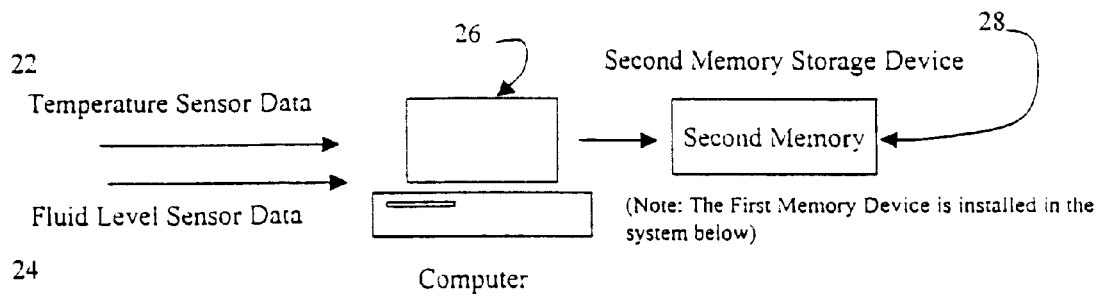
FIG. 3 is a block diagram illustrative of the process of receiving temperature and fluid level data and storing the data on a second memory storage device.

Numerous acceptable levels, above and below the optimum, may be used to provide a range of values to the system. Turning to FIG. 3, dynamic measurements yield temperature sensor data 22 and fluid level sensor data 24. The data is transmitted to a computer 26 and recorded on a second memory storage device 28. The temperature and fluid levels may be varied to provide a variety of data points to the system. The recommended transmission fluid level is also stored in the second memory storage device 28, which can be any type of electronic data storage device including an EPROM. This provides the reference data to be compared with operational sensor data obtained from a transmission operating in the field.

Figure 4:
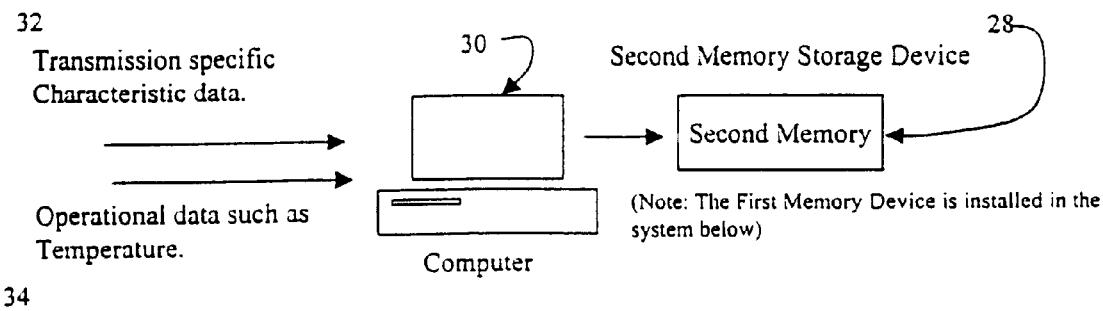
FIG. 4 is a block diagram illustrating a computer simulating dynamic measurements and storing the resulting data on a second memory storage device.

Another method of obtaining information is to rely upon a computer simulation of the transmission. As illustrated in FIG. 4, a computer 30 would simulate the operation of a transmission filled with fluid to the recommended level and ranges. Characteristic data 32 relating to factors such as heat transfer rates and-fluid dispersion, among other factors, within the transmission may be utilized along with operational data such as temperature 34 by the computer to arrive at calculated values for the fluid level and temperature. That information, along with the recommended fluid level data, would be provided to a second memory storage device 28

Figure 5:
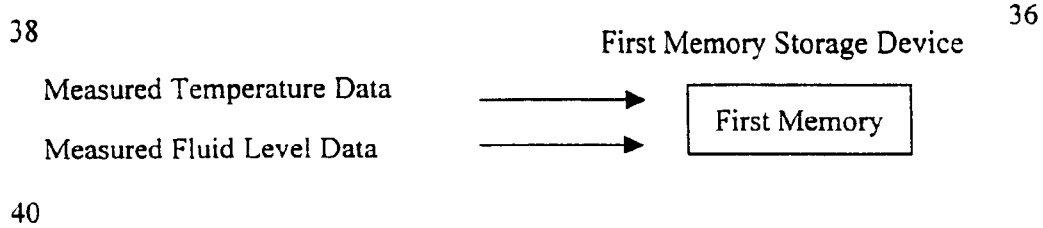
FIG. 5 is a block diagram illustrative of measured data from a transmission operating in the field being stored on a first memory storage device.

A transmission operating in the field has a fluid level sensor, e.g., an electronic dipstick, disposed within the transmission, that provides the system withal fluid level signal that reflects the measured transmission fluid level, relative to the bottom of the pan for example. A temperature sensor within the transmission provides the system with a temperature signal. Referring to FIG. 5, a first data storage device 36, which can be any type of electronic data storage device including an EPROM, retains the measured transmission fluid level data 40 and the measured temperature data 38.

Figure 6:
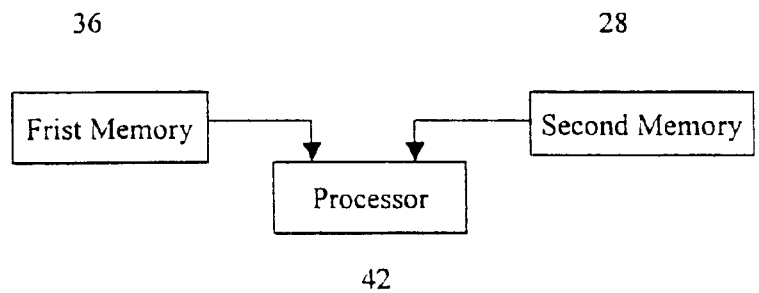
FIG. 6 is a block diagram illustrating a processor comparing the data in the first memory storage device to the data in the second memory storage device.

Turning now to FIG. 6, a processor 42, under the direction of software code, compares the data retained in the first memory 36 and the second memory 28 while incorporating a time delay in reading the data This can be accomplished in a number of ways. In one application, the measured values for the fluid level and fluid temperature from the first memory have corresponding values in the second memory. By locating those corresponding values in the second memory, the processor then retrieves the recommended value from the second memory.

In the cases where no recommended value can be identified, then the processor relies upon software to estimate the value by performing calculations based upon the known values. Other methods can include algorithms that extrapolate values where no identical match is available. The software then directs the processor to determine the operational fluid levels and if the measured level is acceptable, if an alarm is necessary, and if a fluid level change signal is required. Thus, the measurement system can identify an operational fluid level as a specific value or determine if the operational fluid level is within a range of acceptable values.

Figure 7:
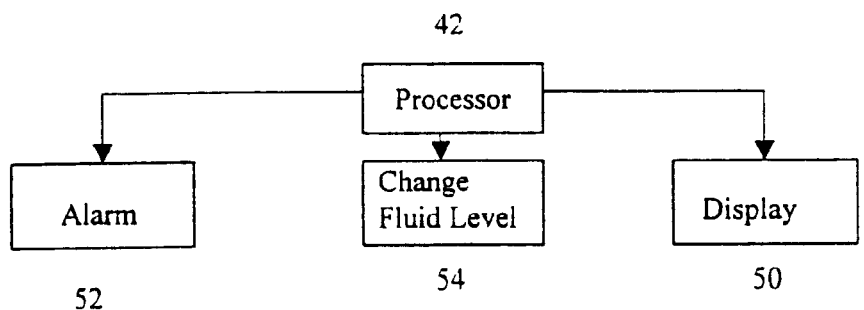
FIG. 7 is a block diagram illustrative of a processor controlling a display, alarm, and fluid level change signal

Referring to FIG. 7, once the operational fluid level is determined, the processor 42 provides information as to the fluid level to a display 50 and optionally the processor determines if the operational fluid level is within a range to activate an alarm. 52 and initiate a change in fluid level 54. Software code provides the instructions to the processor for directing the display and determining if an alarm and a change in fluid level is necessary.

Figure 8:
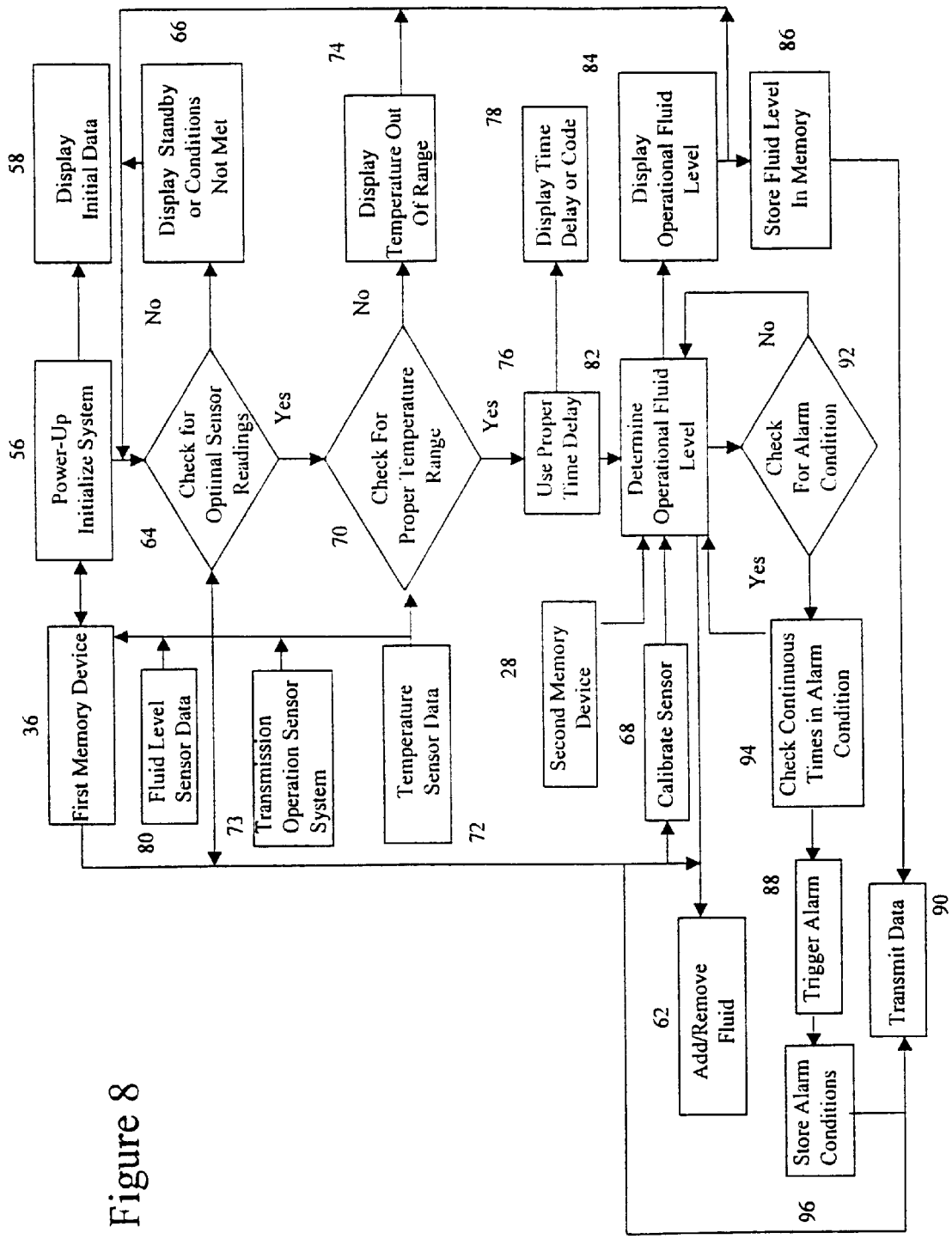
FIG. 8 is a flowchart illustrating a process for activating and stopping a displacement unit.

FIG. 8 illustrates the measurement and display process of the operational fluid level in a transmission in the field, relying on dipstick and temperature data. It includes the ability to send a signal to affect a change the fluid level and initiate an alarm. The system starts with a power up via block 56. Input data is received and an initial display 58 is provided. The input data from the temperature and level sensors is stored in a first memory storage device 36 as discussed previously The memory storage device provides input for a processor to support a decision to add or remove fluid 62 and/or to actuate an alarm 88.

After power up of the system a check is performed for identifying conditions necessary for reading the temperature and level sensor information 64. This includes verifying the proper idle speed, neutral setting and level of inclination of the transmission. This information can be provided by sensors or as an initial setup by an operator. For example, the system could include another sensor to indicate the inclination of the transmission with respect to the horizontal. Where there is no sensor for the inclination, an operator may initially set the inclination as a preliminary step. In the case where the operator sets the inclination, the processor does not receive, or process, inclination data. If the conditions for operation of the system are not met then a standby display 66 is produced followed by the results of the check 64 being provided to a calibration sequence step 68.

The Calibration sequence step 68 performs a check on the sensors to determine if the sensors are operating correctly. This may include a check on the capacitance, resistance, or current flow within the sensor, among other sensor characteristics. If a sensor is not operating within a specified range, then the data from the sensor is adjusted to correct for the variation, or, if the sensor is not functional, or so far out or calibration as to be suspected of malfunction, display and/or level correction functions can be suspended, and a check sensor code will be displayed. The check and calibration as step 68 can be manual or automatic.

If the necessary conditions in check 64 exist, then the temperature from temperature sensor 72 is checked at 70 to verify that it is in the proper operating range. If the proper temperature range is not detected then a temperature out of range condition is shown via 74 and the system returns to the check step 64. If the proper temperature range is detected then a time delay 76 is instituted and shown via display 78 for sampling the sensor data. The fluid level sensor data 80 is read into the first memory device 36, or data storage device, and then corrected for non-linear characteristics, such as when the sensor is operating outside an expected linear range, via step, 68 in the process to determine the measured fluid level.

In determining the operational fluid level at step 82 information from the second memory device 28, or data storage device, regarding the recommended levels of fill is compared to information from the first memory device 36 containing the measured fluid level and temperature The comparison is performed by a processor that is directed by software code. This process may also take into account table data for determining the operational fluid level as a function of temperature. The corrected, or operational, fluid level is displayed on display device 84 and stored in a memory storage device 86. The information is then directed to the transmit data block at 96, which is a terminal or port for external access to the data The check alarm step 92 compares the operational fluid level with acceptable levels stored in the second memory device 28 and identifies if an alarm condition exists, i.e. the measured operational fluid level is not within acceptable limits. The information is provided to the continuous alarm check 94 to determine if an alarm condition existed for an adequate number of time delay periods to trigger an alarm. The check conditions for an alarm status in step 94 verifies if a condition for alarm exists for the necessary time or number of intervals sampled, then an alarm 88 is triggered and the alarm conditions are stored in memory 96. Step 82 generates a fluid change signal 62 if the operational fluid level is not within an acceptable range.

The process at step 82 can be further expanded to incorporate data from other sensors. A transmission operation sensor system 73 can be used to provide the processor with data derived from, but not limited to sensors registering the orientation of the transmission with respect to the horizontal, a gear setting sensor, an idle speed sensor, a throttle position sensor, a transmission fluid dielectric sensor, and a transmission speed sensor The dielectric sensor can be designed to be fully submerged in the fluid when the transmission is not operating. This allows the system to obtain a dielectric value each time the transmission is stopped independent of whether the fluid is at a recommended level or below a recommended level. The system can read the dielectric value and account for drifts, changes, or variations in the value due to such factors, as for example, as the presence of impurities in the fluid or the fluid being exposed to thermal stress. As the system accounts for the dielectric value, the system can more accurately determine the operational fluid level. Furthermore, by comparing the current dielectric value of the fluid each time the system is powered up with values stored in the memory, it can be determined if the fluid quality has deteriorated to a point at which it would be advisable to replace the old fluid with fresh fluid. This information can be communicated by an alarm or display. Additionally, this information can be used to initiate an automatic oil removal and replacement cycle based on the oil quality as indicated by the variations in the fluid dielectric. Also, the dielectric value can be displayed to the operator.

The data from these sensors can be incorporated into the process for determining the operational transmission fluid level through the use of algorithms. Furthermore, the dynamic measurements can provide comparable data for use in comparing the measured values to recommended values and thereby reduce the need for algorithms.

Figure 9:
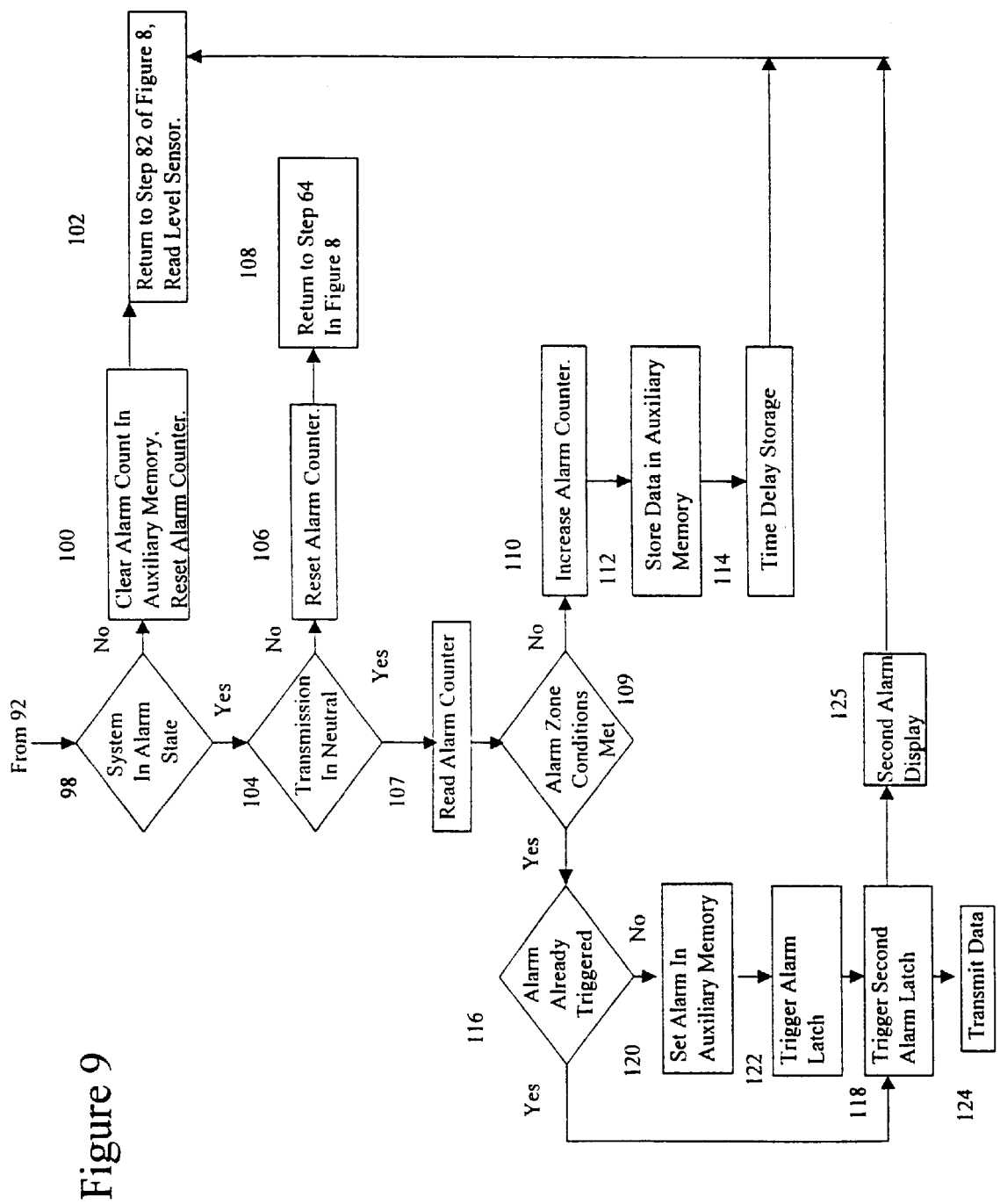
FIG. 9 is a flowchart further illustrating the process involved in step 92 of FIG. 8.

Referring to FIG. 9, this figure is a more detailed representation of the procedures carried out in the check 92 of FIG. 8. The process for triggering a transmission fluid level alarm begins with a check to determine if the level is within the alarm zone as determined in step 98. If the level is not within the alarm zone, then an auxiliary memory containing the alarm memory data 100 is cleared, a counter therein is reset and level sensor data is read again at step 102. If the level is within the alarm zone, then a check 104 is performed to verify that the transmission is in neutral. If the transmission is not in neutral, then an alarm counter 106 is reset and the system conditions are rechecked 108 If the transmission is in neutral, the system, via step 107, reads the number of times that the system has been in the alarm zone. A check is performed at step 109 to determine if the number of alarm conditions meets a predetermined level set in auxiliary memory storage area 112 by the operator or manufacturer. If the number of times in the alarm zone is not at a predetermined level, then the number of counts is increased via 110, the data is stored in a storage device 112 and provided to the time delay calculation 114, and the fluid level sensor is read at step 102. Should the number of times the readings appear in the alarm zone meet the specified amount, then a check 116 is performed to determine if the alarm was already triggered. Where an alarm was already triggered a second alarm 118 is activated and the level sensor is read at step 102. In the instance where the alarm had not been previously triggered then the alarm condition memory 120 is set and the alarm latch 122 is activated. Another check 118 is performed for a previous alarm condition and the data is transmitted that an alarm condition has been activated at 124 by way of a port or other method of data transmittal.

Figure 10:
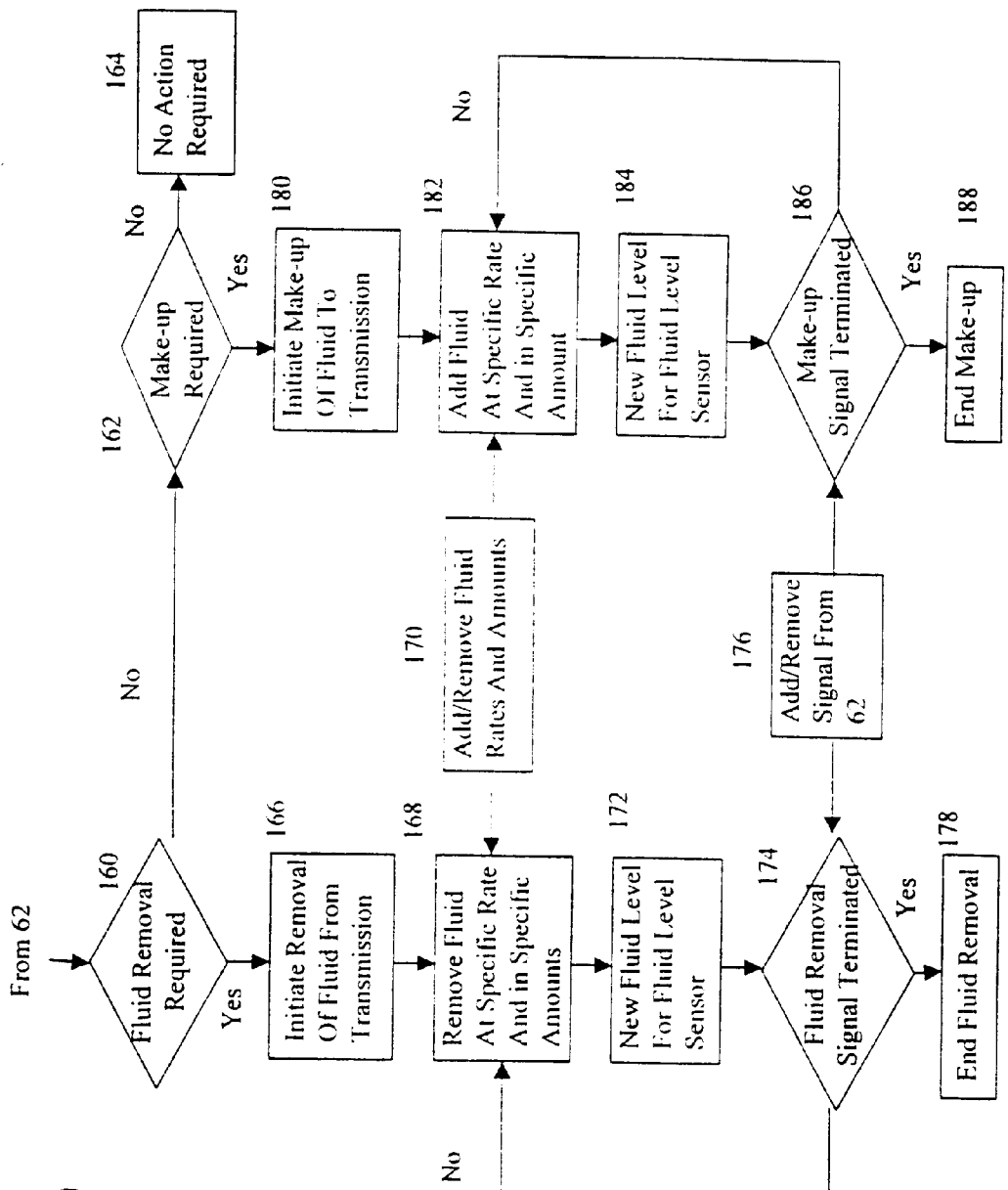
FIG. 10 is a flowchart illustrating a fluid level make-up or fluid removal process.

FIG. 10 is a detailed explanation of the procedure to add or remove transmission fluid. The processor 82 directed by the software code determines if there is a need for a change in fluid level and a signal to add or remove fluid at step 62 is generated. A check 160 is performed to determine if a signal to initiate a fluid removal is present 160. If the signal does not indicate a fluid removal condition, then a check is performed to determine if a signal for a make-up condition exists at step 162. If neither a fluid removal or make-up signal is generated then no action is taken as shown at 164. Signals 62 are received, without action taken, until a fluid removal or make-up signal is present.

In the situation where a fluid removal condition is present, then a removal of fluid is initiated at step 166. A transmission fluid removal system can be accomplished in a number of ways, e.g., by the use of a fluid pump or a fluid displacement unit. Fluid is removed from the transmission at a specific rate and in specific amounts via step 168 as determined by step 170. Step 170 relies upon data in a memory storage device, which can be the second memory storage device 28, directed to the specific transmission fluid removal characteristics. For example, where the removal is dependent upon the number of piston cycles, as with a displacement pump, then the amount removed per stroke and the number of strokes used is stored in memory. Step 170 then determines the rate at which the change in fluid level is implemented.

The change in fluid level 172 will be reflected in 13A the readings taken by the fluid level sensor 80. The new fluid level sensor data is incorporated in the process for determining the operation fluid level in FIG. 8. The process of arriving at the operational fluid level 82 determines if the fluid level is in a state that requires a change in level. Such action drives the continuation or termination of the fluid removal fluid signal 62. The amount of fluid removed and the rate of removal 170 is small enough to allow the system to recognize the change in fluid level without arriving a point where the amount removed is beyond acceptable limits.

In an alternate embodiment, the information concerning the rates of change and amounts of fluid to be removed 170 may be used by a processor at step 170 along with the time of operation of the transmission fluid level removal system to estimate the amount of fluid removed. The estimation would then be used to evaluate if continued removal of fluid is necessary. This has the advantage of providing the system with an approximation of the fluid level faster than reading the electronic dipstick. The reason for the increased speed is that the data from the electronic dipstick incorporates a time delay and calibration delay before being available to the processor. When the processor under the direction of the software code determines if the fluid is within acceptable levels, then the fluid removal signal 62 is terminated The new measured fluid level readings are processed and the system determines if the measured level is acceptable. If not, then the add/remove signal is generated 62.

After an amount of fluid has been removed, a check is performed 174 to determine if the fluid removal signal is still being generated 176. If the fluid removal signal is no longer available, then the system ends the fluid removal 178.

In the situation where a make-up is required, a check 162 is performed to verify the existence of a make-up signal. The addition of fluid to the transmission is initiated 180. A transmission fluid addition system can be accomplished in a number of ways, e.g., by the use of a fluid pump or a fluid displacement unit. Fluid is added at a specific rate and in specific amounts via step 182 as determined by step 170. Step 170 relies upon data in a memory storage device, which can be the second memory storage device 28, directed to the specific transmission fluid addition characteristics. For example, where the addition is dependent upon the number of piston cycles, as with a displacement pump, then the amount removed per stroke and the number of strokes used is stored in memory. Step 170 then determines the rate at which the change in fluid level is implemented.

The change in fluid level at step 184 will be reflected in the readings taken by the fluid level sensor 80. The new fluid level sensor data is incorporated in the process for determining the operation fluid level in FIG. 8. The process of arriving at the operational fluid level 82 determines if the fluid level is in a state that requires a change in level. Such action drives the continuation or termination of the make-up fluid signal 62. The amount of fluid added and the rate of addition 170 is small enough to allow the system to recognize the change in fluid level without arriving a point where the amount added is beyond acceptable limits.

In an alternate embodiment, the information concerning the rates of change and amounts of fluid removed via processing step 170 would be used by the processor along with the time of operation of the transmission fluid addition system to estimate the amount of fluid added. The estimation would then be used to evaluate if continued removal of fluid is necessary. This has the advantage of providing the system with an approximation of the fluid level faster than reading the electronic dipstick. The reason for the increased speed is that the data from the electronic dipstick incorporates a time delay and calibration delay before being available to the processor. Additionally, when the equipment is not in neutral, the sensor readings are suspended. When the processor under the direction of the software code determines if the fluid is within acceptable levels, then the make-up signal 62 is terminated. The new measured fluid level readings are processed and the system determines if the measured level is acceptable. If not, then the add/remove signal is generated 62.

After an amount of fluid has been added, a check is performed 186 to determine if the make-up signal is still being generated 176. If the make-up signal is no longer available, then the system ends the make-up 188.

The preceding description of the invention in reference to the drawings can be easily understood by an example. A simple description of the operation of the system can illustrative of the principles described.

In operation, the dipstick and temperature readings are sensed and the information stored in a first memory device. A processor compares the information concerning the controlled dynamic measurements in the second memory storage device to the measured information in the first memory storage device. The processor, under the direction of the software code, utilizes this information to determine the operational transmission fluid level. Next, the processor, under the direction of software. code, then compares the operational transmission fluid level to the acceptable level of operation in the memory. If the system is not operating within the defined parameters, the processor can optionally signal an alarm and initiates a signal to change the level of the transmission fluid level.

The addition or removal of fluid can be accomplished by any number of oil adjustment means including, but not limited to a pump or displacement unit. For example, a transmission fluid cooling system that circulates the fluid can be used in conjunction with a valve to facilitate the removal of fluid. Activation of the valve would divert an amount of fluid to another storage vessel or to the fuel tank. The alarm can be audio and/or visual. Also, the processor controls a display device that informs the operator of the operational transmission fluid level. The display can be of any type of analog or display device.

Where data from the sensors is compared to controlled dynamic measurements the system may use an algorithm for determining whether or not the readings are within acceptable levels. Other algorithms can be used to determine operational values of sensor readings. As an example, the measured capacitance of the fluid and the measured fluid temperature may be values used by an algorithm to determine the operational capacitance.

In the alternative, numerous recommended fluid levels may be stored in memory and the processor can locate the closest data point above and below the point identified by the measured temperature and fluid level. Then the processor, utilizing an algorithm, can extrapolate the operational fluid level.

In practice, other sensors can be added to provide data as to the capacitance of the fluid, measured level of the fluid, fluid dielectric, gear setting, throttle position, gear mechanism speed, incline of the transmission with respect to the horizontal, and transmission idle speed. The use of multiple sensors forms a transmission operation sensor system for use in controlled dynamic and operational measurements.

While the present invention has been described in regards to a preferred embodiment, it is understood that various modifications may be made by those skilled in the art without departing from the scope or spirit of the invention as identified in the appended claims. The present invention is applicable to a machine that uses fluids and has rotating and/or reciprocating elements.

What is claimed is:

1. A fluid level measuring system for machines comprising:
   a) a fluid level sensor for transmitting a fluid level signal corresponding to a measured fluid level;
   b) a temperature sensor for transmitting a temperature signal corresponding to the measured fluid temperature;
   c) a first data storage device for retaining data directed to the measured fluid temperature and the measured fluid level;
   d) a second data storage device for retaining data directed to a recommended fluid level as a function of fluid level and fluid temperature;
   e) processing means for determining the operational fluid level by evaluating the data in the first data storage device with the data in the second data storage device; and
   f) a computer processor for triggering an adjustment of said operational fluid level when said operational fluid level is not operating within acceptable limits.

2. A fluid level measuring system for machines as in claim 1, wherein the machine is a transmission.

3. A fluid level measuring system for machines as in claim 1, wherein the machine is an internal combustion engine.

4. A fluid level measuring system for machines as in claim 1, wherein the machine is a gearbox.

5. A fluid level measuring system for machines as in claim 1, wherein the machine is hydraulic.

6. A fluid level measuring system for machines as in claim 5, further comprising:
   display means for indicating the operational fluid level as determined by the processing means.

7. A fluid level measuring system for machines as in claim 6, further comprising:
   a) a data storage device for retaining data directed to the conditions for initiating an alarm; and
   b) alarm means for indicating an operational fluid level operating within conditions for initiating an alarm.

8. A fluid level measuring system for machines as in claim 7, further comprising:
   a) fluid level adjustment means for changing the fluid level to a level determined by the processing means.

9. A fluid level measuring system for machines as in claim 1, wherein the first and second data storage devices are an EPROM and the data is in tabular form.

10. A fluid level measuring system for machines as in claim 1, wherein the first and second data storage devices are an EPROM and the data is in the form of constants.

11. A fluid level measuring system for machines as in claim 1, wherein the processing means for measuring the measured fluid level incorporates an algorithm for determining the capacitance of the fluid as a factor of temperature.

12. A fluid level measuring system for machines as in claim 11, wherein the processing means compares the operational fluid level with the measured characteristics of the machine stored in the data storage device to determine whether the fluid level is operating within acceptable limits.

13. A fluid level measuring system for machines as in claim 1, wherein the machine is carried by a frame and further comprising a level meter or inclinometer disposed on the frame and adapted for transmitting a machine level signal corresponding to the machine orientation with respect to the horizontal.

14. A fluid level measuring system for machines as in claim 1, further comprising a machine operation sensor system adapted for transmitting a variety of machine operation signals corresponding to the machine state of operation.

15. A fluid level measuring system for machines as in claim wherein the machine operation sensor system includes a speed sensor for transmitting a speed signal respective of a speed of operation of the machine.

16. A fluid level measuring system for machines as in claim 14, wherein the machine operation sensor system includes a gear setting sensor adapted for use with a gear assembly having a variety of settings for transmitting a gear assembly setting signal.

17. A fluid level measuring system for machines as in claim 14, wherein the machine operation sensor system includes an idle speed sensor adapted for use with a machine for transmitting an idle speed signal.

18. A fluid level measuring system for machines as in claim 14, wherein the machine is equipped with a throttle for controlling speed and wherein the machine operation sensor system includes a throttle sensor adapted for use with a throttle for transmitting a throttle position signal.

19. A fluid level measuring system for machines as in claim 14, wherein:
   a) the second data storage device retains data directed to the nominal responses of the machine operation sensor system signals; and
   b) the processing means incorporates the sensor signals received from the machine operation sensor system and the data directed to the nominal response of the machine operation sensor system signals in determining the operational fluid level.

20. A fluid level measuring system for machines as in claim 14, further comprising a dielectric sensor disposed within the machine and adapted for transmitting a signal corresponding to the dielectric value of the fluid.

21. A fluid level measuring system for machines as in claim 20, wherein:
   a) a data storage device is arranged to retain data directed to the dielectric value of the fluid;
   b) the processing means is arranged to compare the dielectric sensor signal to the dielectric value of the fluid represented by the data storage device; and
   c) the processor means is arranged to determine if the fluid level requires adjustment based upon the comparison between. the data directed to the dielectric value of the fluid and the dielectric sensor signal.

22. A fluid level measuring system for machines as in claim 21, further comprising a display for displaying the level of dielectric deterioration.

23. A fluid level measuring system for machines comprising:
   a) a fluid level sensor disposed within the machine and adapted for transmitting a fluid level signal corresponding to a measured fluid level;
   b) a temperature sensor disposed within the machine and adapted for transmitting a temperature signal corresponding to a measured fluid temperature;
   c) a first data storage device for retaining data directed to the measured of fluid temperature and the measured fluid level;
   d) a second data storage device for retaining data directed to the operation characteristics of the machine and conditions for initiating an alarm;
   e) processing means for determining an operational fluid level by evaluating the data in the first data storage device with the data in the second data storage device;
   f) processing means for initiating a change in the fluid level;
   g) oil level adjustment means for changing the fluid level to a level determined by the processing means;
   h) alarm means for indicating an operational fluid level operating within the condition or initiating an alarm;
   i) display means for indicating the operational fluid level as determined by the processing means; and
   j) computer processor for triggering an adjustment of said operational fluid level when said operational fluid level is not operating within acceptable limits.

24. A method for measuring the fluid level of a machine comprising the steps of:
   a) receiving sensor inputs as to a measured fluid temperature and a measured fluid level;
   b) retaining data directed to a recommended fluid level as a function of the measured fluid level and the measured fluid temperature;
   c) comparing the sensor inputs to the retained data to arrive at an operational fluid level; and
   d) computerized triggering of an adjustment to the fluid level if the operational fluid level is not operating, within acceptable limit.

25. A method for measuring the fluid level of a machine as in claim 24, further comprising the steps of:
   a) storing measured characteristics for the machine which characteristics determine recommended levels of fluid as a function of fluid temperatures and fluid levels;
   b) comparing the measured fluid level and measured fluid temperature to the stored measured characteristics for the machine; and
   c) determining if the operational fluid level is operating within acceptable limits.

26. A method for measuring the fluid level of a machine as in claim 25, further comprising the step of activating an alarm if the operational fluid level is not operating within acceptable limits.

27. A method for measuring the fluid level of the machine as in claim 25, further comprising the steps of:
   a) receiving sensor inputs as to a fluid dielectric value;
   b) storing fluid dielectric information;
   c) comparing the stored fluid dielectric information with the sensor data of the fluid dielectric value; and
   d) initiating a change in the fluid level if the sensor fluid dielectric value is not within acceptable limits.

28. A fluid level measurement computer based system comprising:
   a) sensors for providing a measured fluid level signal and a measured temperature signal;
   b) a computer memory for retaining data directed to a recommended fluid level based upon a variety of fluid leave signals and temperature signals;
   c) a computer processor for comparing the measured fluid level signal and the measured temperature signal to the data in the computer memory to arrive at the operational fluid level; and
   d) a second computer processor for triggering an adjustment to the fluid level if the operational fluid level is not operating within acceptable limits.

29. A fluid level measurement computer based system as in claim 28, wherein:
   a) the computer memory retains data directed to acceptable operational fluid levels;
   b) the computer processor compares the operational fluid level to the acceptable operational fluid levels retained in the computer memory; and
   c) the computer processor initiates an alarm when the operational fluid level is beyond the acceptable operational fluid levels.

30. A fluid level measurement computer based system as in claim 29, further comprising:
   a) a display for indicating the operational fluid level, and wherein;

b) the processor for controlling the display and providing the operational fluid level to said display.

31. A fluid level measurement computer based system as in claim 30, further comprising means for removing or adding fluid to the machine and wherein the processing means is arranged to actuate the addition or removal of fluid.

32. A computer based method for determining the fluid level of a machine, comprising the steps of:
   a) storing a variety of recommended fluid level data in a second computer memory based upon a range of parameters which affect the operational fluid level within the machine;
   b) receiving sensor inputs directed to measure said parameters;
   c) storing the sensor inputs in a first computer memory;
   d) comparing the data in the first computer memory to the data in the second computer memory;
   e) the measured parameters include the level of fluid within the machine during operation;
   f) the measured parameters include the temperature of the fluid;
   g) determining an operational fluid level;
   h) comparing the operational fluid level to the stored recommended fluid level;
   i) determining if the operational fluid level is operating within acceptable limits;
   j) initiating an alarm if the operational fluid is beyond an acceptable range;
   k) triggering an adjustment of the fluid level if the operational fluid level is not operating within acceptable limits; and
   l) displaying the operational fluid level.

33. A fluid level measurement computer program comprising:
   a) means for retrieving recommended fluid level data based upon a range of fluid levels and fluid temperature levels;
   b) means for reading a measured fluid level on a measured fluid temperature;
   c) means for initiating a time delay in reading the measured fluid level and measured fluid temperature;
   d) means for comparing the measured transmission fluid level and the measured fluid temperature to arrange the fluid levels and fluid temperatures to arrive at the operational fluid level;
   e) means for determining if the operational fluid level is within acceptable limits;
   f) means for initiating an alarm if the operational fluid level is beyond acceptable limits;
   g) means for displaying the operational fluid level;
   h) computerized means for triggering an adjustment to the fluid level if the operational fluid level is not operating within acceptable limits.

34. A fluid level measuring system for machines comprising:
   a) a fluid level sensor disposed within the machine and adapted for transmitting a fluid level signal corresponding to a measured fluid level;
   b) a temperature sensor disposed within the machine and adapted for transmitting a temperature signal corresponding to the measured fluid temperature;
   c) a first data storage device for retaining data directed to the measured fluid temperature and the measured fluid levels;
   d) a second data storage device for retaining data to a recommended fluid level as a function of fluid level and fluid temperature;
   e) processing means for comparing the data from the first data storage device to the data in the second data storage device;
   f) processing means for utilizing the comparison of the data in the first data storage device to the data in the second data storage device to arrive at the operational fluid level;
   g) processing means for determining if the operational fluid level is below the recommended fluid level;
   h) processing means for determining if the operational fluid level is above the recommended fluid level;
   i) processing means for controlling the display to indicate the operational fluid level;
   j) display means for displaying the operational fluid level; and
   k) computerized means for triggering an adjustment to the fluid level if the operational fluid level is not operating within acceptable limits.

35. A fluid level measuring system for machines as in claim 34, further comprising:
   a) processing means for initiating an alarm;
   b) processing means for initiating an adjustment in the fluid level, and;
   c) processing means for reevaluating the operational fluid level.

36. A fluid level measuring system for machines as in claim 35, further comprising:
   a) memory means for retaining data directed to the rate of removal of fluid flora fluid removal system;
   b) sensor means for sensing data as to the time of operation of the fluid removal system;
   c) processing means for estimating the amount of fluid removed based upon the data retained in the memory and the sensor data as to the time of operation of the fluid removal system; and
   d) processing means for determining the requirement for removing fluid based upon the estimated amount of fluid removed.

37. A fluid level measuring system for machines as in claim 36, further comprising:
   a) memory means for retaining data directed to the rate of addition of fluid for a fluid addition system;
   b) sensor means for sensing data as to the time of operation of the fluid addition system;
   c) processing means for estimating the amount of fluid removed based upon the data retained in the memory and the sensor data as to the time of operation of the fluid addition system; and
   d) processing means for determining the requirement for adding fluid based upon the estimated amount of fluid removed.

38. A computer based method for determining a fluid level, comprising the steps of:
   storing a single recommended fluid level data point in a second computer memory based upon a range of fluid level signals and fluid temperature signals;
   receiving sensor inputs directed to a measured fluid temperature and a measured fluid level;
   storing the sensor inputs in a first computer memory;
   utilizing a time delay to sample the sensor inputs;

comparing the data in the first computer memory to the data in the second computer memory;

determining an operational fluid level;

comparing the operational fluid to the stored recommended fluid level;

determining if the operational fluid is operating within acceptable limits; initiating an alarm if the operational fluid level is beyond an acceptable range; and triggering an adjustment of the fluid level if the operational fluid level is not operating within acceptable limits.

39. A transmission fluid measurement system comprising:
a) a fluid level sensor for transmitting a fluid level signal corresponding to a measured transmission fluid level;
b) a temperature sensor for transmitting a temperature signal corresponding to the measured transmission fluid temperature;
c) a first data storage device for retaining data directed to the measured transmission fluid temperature and the measured transmission fluid level;
d) a second data storage device for retaining data directed to a recommended transmission fluid level as a function of transmission fluid level and transmission fluid temperature;
e) processing means for determining the operational transmission fluid level by evaluating the data in the first data storage device with the data in the second data storage device; and
f) computerized means for triggering an adjustment of the transmission fluid level if the operational fluid level is not operating within acceptable limits.

40. A transmission fluid level measurement system as in claim 39, further comprising:
display means for indicating the operational transmission fluid level as determined by the processing means.

41. A transmission fluid level measurement system as in claim 40, further comprising:
a) a data storage device for retaining data directed to the conditions for initiating an alarm; and
b) alarm means for indicating an operational transmission fluid level operating within conditions for initiating an alarm.

42. A transmission fluid level measurement system as in claim 41, further comprising:
a) processing means for initiating a change in the transmission fluid level; and
b) oil level adjustment means for changing the transmission fluid level to a level determined by the processing means.

43. A transmission fluid level measurement and displaying system as in claim 40, wherein the transmission is carried by a vehicle frame and further comprising a level meter or inclinometer disposed on the frame and adapted for transmitting a transmission level signal corresponding to the transmission orientation with respect to the horizontal.

44. A transmission fluid level measurement and displaying system as in claim 40, further comprising a transmission operation sensor system adapted for transmitting a variety of transmission operation signals corresponding to the transmission state of operation.

45. A transmission fluid level, measurement and displaying system as in claim 44, wherein the transmission operation sensor system includes a speed sensor adapted for use with a transmission gear mechanism for transmitting a transmission gear mechanism speed signal.

46. A transmission fluid level measurement and displaying system as in claim 44, wherein the transmission operation sensor system includes a gear setting sensor adapted for use with a transmission gear assembly having a variety of settings for transmitting a transmission gear assembly setting signal.

47. A transmission fluid level measurement and displaying system as in claim 44, wherein the transmission operation sensor system includes an idle speed sensor adapted for use with a transmission for transmitting an idle speed signal.

48. A transmission fluid level measurement and displaying system as in claim 44, wherein the transmission is coupled to an engine equipped with a throttle for controlling the engine speed and wherein the transmission operation sensor system includes a throttle sensor adapted for use with a throttle for transmitting a throttle position signal.

49. A transmission fluid level measurement and displaying system as in claim 44, wherein:
a) the second data storage device retains data directed to the nominal responses of the transmission operation sensor system signals; and
b) the processing means incorporates the sensor signals received from the transmission operation sensor system and the data directed to the nominal response of the transmission operation sensor system signals in determining the operational transmission fluid level.

50. A transmission fluid level measurement and displaying system as in claim 44, further comprising a dielectric sensor disposed within the transmission and adapted for transmitting a signal corresponding to the dielectric value of the fluid.

51. A transmission fluid level measurement and displaying system as in claim 44, wherein:
a) a data storage device is arranged to retain data directed to the dielectric value of the fluid;
b) the processing means is arranged to compare the dielectric sensor signal to the dielectric value of the fluid represented by the data storage device; and
c) the processor means is arranged to determine if the fluid level requires adjustment based upon the comparison between the data directed to the dielectric value of the fluid and the dielectric sensor signal.

52. A method for measuring the transmission fluid level as in claim 51, further comprising a display for displaying the level of dielectric deterioration.

53. A transmission fluid level measurement and displaying system as in claim 39, wherein the processing means for measuring the measured transmission fluid level incorporates an algorithm for determining the capacitance of the transmission fluid as a factor of temperature.

54. A transmission fluid level measurement and displaying system as in claim 53, wherein the processing means compares the operational transmission fluid level with the measured characteristics of the transmission stored in the data storage device to determine whether the transmission fluid level is operating within acceptable limits.

55. A transmission fluid level measurement system comprising:
a) a fluid level sensor disposed within the transmission and adapted for transmitting a fluid level signal corresponding to a measured transmission fluid level;
b) a temperature sensor disposed within the transmission and adapted for transmitting a temperature signal corresponding to a measured transmission fluid temperature;
c) a first data storage for retaining data directed to the measured transmission fluid temperature and the measured transmission fluid level;

d) a second data storage device for retaining data directed to the operational characteristics of the transmission and conditions for initiating an alarm;

e) processing means for determining an operational transmission fluid level by evaluating the data in the first data storage device with the data in the second data storage device;

f) processing means for initiating a change in the transmission level fluid;

g) oil level adjustment means for changing the transmission fluid level to a level determined by the processing means;

h) alarm means for indicating an operational transmission fluid level operating within the condition for initiating an alarm;

i) display means for indicating the operational transmission fluid level as determined by the processing means; and j) computerized means for triggering an adjustment of the transmission fluid level if the operational fluid level is not operating within acceptable limits.

56. A transmission fluid level measurement and displaying system as in claim 55, wherein the first and second data storage devices are an EPROM and the data is in tabular form.

57. A transmission fluid level measurement and displaying system as in claim 51, wherein the first and second data storage devices are an EPROM and the data is in the form of constants.

58. A method for measuring the transmission fluid level comprising the steps of:

a) receiving sensor inputs as to a measured transmission fluid temperature and a measured transmission fluid level;

b) retaining data directed to a recommended transmission fluid level as a function of the measured transmission fluid level and the measured transmission temperatures;

c) comparing the sensor inputs to the retained data to arrive at an operational transmission fluid level;

d) storing measured characteristics for the transmission which characteristics determine recommended levels of transmission fluid as a function of transmission fluid temperatures and transmission fluid levels;

e) comparing the measured transmission fluid level and measured transmission fluid temperature to the stored measured characteristics for the transmission;

f) determining if the operational transmission fluid level is operating within acceptable limits;

g) activating an alarm if the operational transmission fluid level is not operating within acceptable limits; and h) triggering an adjustment of the transmission fluid if the operational transmission fluid level is not operating within acceptable limits.

59. A method for measuring the transmission fluid level as in claim 58, further comprising the steps of:

a) receiving sensor inputs as to a transmission fluid dielectric value;

b) storing transmission fluid dielectric information;

c) comparing the stored transmission fluid dielectric information with the sensor data of the transmission fluid dielectric value; and d) initiating a change in the transmission fluid level if the sensor fluid dielectric value is not within acceptable limits.

60. A transmission fluid level measurement computer based system comprising:

a) means for retrieving a measured transmission fluid level signal and a measured transmission temperature signal;

b) computer memory means for retaining data directed to a recommended transmission fluid level based upon a variety of transmission fluid level signals and transmission temperature signals;

c) computer processor means for comparing the measured transmission fluid level signal and the measured transmission temperature signal to the data in the computer memory to arrive at the operational transmission fluid level and d) computerized means for triggering an adjustment of the transmission fluid level if the operational fluid level is not operating within acceptable limits.

61. A transmission fluid level measurement computer based system as in claim 60, wherein:

a) the computer memory means retains data directed to acceptable operational transmission fluid levels;

b) the computer processor means compares the operational transmission fluid level to the acceptable operational transmission fluid levels retained in the computer memory; and c) the computer processor means initiates an alarm when the operational transmission fluid level is beyond the acceptable operational transmission fluid levels.

62. A transmission fluid level measurement computer based system as in claim 61, further comprising:

a) display means for indicating the operational transmission fluid level; and b) processor means for controlling the display and providing the operational transmission fluid level to said display.

63. A transmission fluid level measurement computer based system as in claim 60, further comprising means for removing or adding fluid to the transmission and wherein the processing means is arranged to actuate the addition or removal of transmission fluid.

64. A computer based method for determining a transmission fluid level, comprising the steps:

storing a variety of recommended transmission fluid level data and a second computer memory based upon a range of transmission fluid level signals and transmission temperature signals;

receiving sensor inputs directed to a measured transmission fluid temperature and a measured transmission fluid level;

storing the sensor inputs in a first computer memory;

comparing the data in the first computer memory to the data in the second computer memory;

determining an operational transmission fluid level;

comparing the operational transmission to the stored recommended transmission fluid level;

determining if the operational transmission fluid level is operating within acceptable limits;

initiating an alarm if the operational transmission fluid level is beyond an acceptable range; and triggering an adjustment of the transmission fluid level if the operational transmission fluid level is not operating within acceptable limits; and displaying the operational transmission fluid level.

65. A transmission fluid measurement computer program comprising:

a) means for retrieving recommended transmission fluid level data based upon a range of transmission fluid levels and transmission temperature levels;

b) means for reading a measured transmission fluid level and a measured transmission temperature;

c) means for initiating a time delay in reading the measured transmission fluid level and measured transmission temperature;

d) means for comparing the measured transmission fluid leveland the measured transmission temperature to a range of transmission fluid levels and transmission fluid temperatures to arrive at the operational transmission fluid levels, e) means for determining if the operational transmission fluid level is within acceptable limits;

f) means for initiating an alarm if the operational transmission fluid level; is beyond acceptable limits;

g) means for displaying the operational transmission fluid level; computerized means for triggering an adjustment of the measured transmission fluid level if the operational transmission fluid level is beyond acceptable limits.

66. A transmission fluid level measurement system comprising:

a) a fluid level sensor disposed within the transmission and adapted for transmitting a fluid level signal corresponding to a measured transmission fluid level;

b) a temperature sensor disposed within the transmission and adapted for transmitting a temperature signal corresponding to the measured transmission fluid temperature;

c) a first data storage device for retaining data directed to the measured transmission fluid temperature and the measured transmission fluid level;

d) a second data storage device for retaining data directed to a recommended transmission fluid level as a function of transmission fluid level and transmission fluid temperature;

e) processing means for comparing the data in the first data storage device to the data in the second data storage device;

f) processing means for utilizing the comparison of the data in the first data storage device to the data in the second data storage device to arrive at the operational transmission fluid level;

g) processing means for determining if the operational transmission fluid level is below the recommended transmission fluid level;

h) processing means for determining if the operational transmission fluid level is above the recommended transmission fluid level;

i) processing means for controlling a display to indicate the operational transmission fluid level;

j) display means for displaying the operational transmission fluid level; and k) computerized means for triggering an adjustment of the transmission level if the operational fluid level is not operating within acceptable limits.

67. A transmission fluid level measurement system as in claim 66, further comprising:

a) processing means for initiating an alarm;

b) processing means for initiating an adjustment in the transmission fluid level; and c) processing means for reevaluating the operational transmission fluid level.

68. A transmission fluid level measurement system as in claim 67, further comprising:

a) memory means for retaining data directed to the rate of removal of transmission fluid for a transmission fluid removal system;

b) sensor means for sensing data as to the time of operation of the transmission fluid removal system;

c) processing means for estimating the amount of transmission fluid removed based upon the data retained in the memory and the sensor data as to the time of operation of the transmission fluid removal system;

d) processing means for determining the requirement for removing transmission fluid based upon the estimated amount of retransmission fluid removed.

69. A transmission fluid level measurement system as in claim 68, further comprising:

a) memory means for retaining data directed to the rate of addition of transmission fluid for a transmission fluid addition system;

b) sensor means for sensing data as to the time of operation of the transmission fluid addition system;

c) processing means for estimating the, amount of transmission fluid removed based upon the data retained in the memory and the sensor data as to the time of operation of the trasmissison fluid addition system; and d) processing means for determining the requirement for adding transmission fluid based upon the estimated amount of transmission fluid removed.

70. A computer based method for determining a transmission fluid level comprising the steps of:

storing a single recommended transmission fluid level data point in a second jog, computer memory based upon a range of transmission fluid level signals and transmission temperature signals;

receiving sensor inputs directed to a measured transmission fluid temperature and a measured transmission fluid level;

storing the sensor inputs in a first computer memory;

utilizing a time delay to sample the sensor input;

comparing the data in the first computer memory to the data in the second computer memory;

determining an operational transmission fluid level;

comparing the operational transmission fluid level to the stored recommended transmission fluid level;

determining if the operational transmission fluid level is operating within acceptable limits;

initiating an alarm if the operational transmission fluid level is beyond an acceptable range; and triggering an adjustment of the transmission fluid level if the operational transmission fluid level is not operating within acceptable limits.

* * * * *